(12) United States Patent
Hu et al.

(10) Patent No.: US 11,424,520 B2
(45) Date of Patent: Aug. 23, 2022

(54) LIQUID CRYSTAL PHASE SHIFTER INCLUDING A LIQUID CRYSTAL LAYER LOCATED BETWEEN FIRST AND SECOND FLEXIBLE SUBSTRATES, WHERE A THIRD FLEXIBLE SUBSTRATE PROVIDES A FEED PORTION

(71) Applicant: Chengdu Tianma Micro-Electronics Co., Ltd., Chengdu (CN)

(72) Inventors: Yingru Hu, Chengdu (CN); Bo Wu, Chengdu (CN); Xuhui Peng, Shanghai (CN)

(73) Assignee: CHENGDU TIANMA MICRO-ELECTRONICS CO., LTD., Chengdu (CN)

(*) Notice: Subject to any disclaimer, the term of this patent is extended or adjusted under 35 U.S.C. 154(b) by 32 days.

(21) Appl. No.: 16/958,735

(22) PCT Filed: May 21, 2019

(86) PCT No.: PCT/CN2019/087676
§ 371 (c)(1),
(2) Date: Jun. 28, 2020

(87) PCT Pub. No.: WO2019/228213
PCT Pub. Date: Dec. 5, 2019

(65) Prior Publication Data
US 2021/0080765 A1 Mar. 18, 2021

(30) Foreign Application Priority Data
May 31, 2018 (CN) .......................... 201810548743.0

(51) Int. Cl.
*H01P 1/18* (2006.01)
*G02F 1/13* (2006.01)
(Continued)

(52) U.S. Cl.
CPC ............ *H01P 1/181* (2013.01); *G02F 1/1313* (2013.01); *G02F 1/1333* (2013.01);
(Continued)

(58) Field of Classification Search
CPC .. H01P 1/181; H01P 1/18; H01P 1/184; H01P 9/00; H01Q 3/36
(Continued)

(56) References Cited

U.S. PATENT DOCUMENTS 8,009,114 B2* 8/2011 Hauhe et al. ............. H01P 1/18
343/754
2001/0017577 A1 8/2001 Toko et al.
(Continued)

FOREIGN PATENT DOCUMENTS

CN 202548485 U 11/2012
CN 103493292 A 1/2014
(Continued)

*Primary Examiner* — Benny T Lee
(74) *Attorney, Agent, or Firm* — Kilpatrick Townsend & Stockton, LLP (57) ABSTRACT

Provided are a liquid crystal phase shifter and an antenna. The liquid crystal phase shifter includes a first substrate, a second substrate, a liquid crystal layer, and at least one phase shift unit. The first substrate includes a first flexible substrate and a first liquid crystal alignment layer located on a side of the first flexible substrate close to the second substrate. The second substrate includes a second flexible substrate and a second liquid crystal alignment layer located on a side of the second flexible substrate close to the first substrate. The phase shift unit includes a microstrip line and a phased electrode. The microstrip line is located between the first flexible substrate and the first liquid crystal alignment layer, and the phased electrode is located between the second flexible substrate and the second liquid crystal alignment layer.

20 Claims, 6 Drawing Sheets (51) Int. Cl.
*G02F 1/1343* (2006.01)
*H01Q 3/36* (2006.01)
*G02F 1/133* (2006.01)
*G02F 1/1333* (2006.01)
*H01Q 3/30* (2006.01)

(52) U.S. Cl.
CPC ........ *G02F 1/1343* (2013.01); *G02F 1/13306* (2013.01); *H01P 1/184* (2013.01); *H01Q 3/30* (2013.01); *H01Q 3/36* (2013.01)

(58) Field of Classification Search
USPC ........................................................ 333/161
See application file for complete search history.

(56) References Cited

U.S. PATENT DOCUMENTS

| | | | |
|---|---|---|---|
| 2014/0022029 A1* | 1/2014 | Glushchenko et al. | H01P 1/184 977/773 |
| 2015/0380789 A1* | 12/2015 | Jakoby et al. | H01P 1/181 343/905 |
| 2016/0241217 A1 | 8/2016 | Sazegar et al. | |

FOREIGN PATENT DOCUMENTS

| | | |
|---|---|---|
| CN | 103975483 A | 8/2014 |
| CN | 106125417 A | 11/2016 |
| CN | 106532200 A | 3/2017 |
| CN | 106940502 A | 7/2017 |
| CN | 107431275 A | 12/2017 |
| CN | 107453013 A | 12/2017 |
| CN | 107994302 A | 5/2018 |
| CN | 108563050 A | 9/2018 |
| CN | 108761862 A | 11/2018 |
| JP | 2002330006 A | 11/2002 |
| JP | 2016171501 A | 9/2016 |

* cited by examiner

LIQUID CRYSTAL PHASE SHIFTER INCLUDING A LIQUID CRYSTAL LAYER LOCATED BETWEEN FIRST AND SECOND FLEXIBLE SUBSTRATES, WHERE A THIRD FLEXIBLE SUBSTRATE PROVIDES A FEED PORTION

The present disclosure is a U.S. National State of International Application No. PCT/CN2019/087676, filed on May 21, 2019, which claims the priority of Chinese Patent Application No. 201810548743.0, entitled "LIQUID CRYSTAL PHASE SHIFTER AND ANTENNA", and filed on May 31, 2018, the content of which are incorporated herein by reference in its entirety.

FIELD

The present disclosure relates to the field of electromagnetic waves, in particular to a liquid crystal phase shifter and an antenna.

BACKGROUND

A phase shifter is a device for adjusting a phase of an electromagnetic wave, and is widely used in various fields, such as radar, missile attitude control, accelerator, communications, instrumentation, and even music field.

With the development of technology, a new liquid crystal phase shifter has been presented. However, in the current liquid crystal phase shifter, a liquid crystal cell is generally made up by a rigid substrate, which makes the liquid crystal phase shifter have a relatively large hardness, limiting its application scope.

SUMMARY OF THE DISCLOSURE

In view of the above background description, embodiments of the present disclosure provide a liquid crystal phase shifter and an antenna, which can make the liquid crystal phase shifter have a deformable characteristic and can be applied to much more scenarios.

One embodiment of the present disclosure provides a liquid crystal phase shifter, and the liquid crystal phase shifter includes:

a first substrate including a first flexible substrate and a first liquid crystal alignment layer;

a second substrate including a second flexible substrate and a second liquid crystal alignment layer, where the first liquid crystal alignment layer is located on a side of the first flexible substrate close to the second substrate, and the second liquid crystal alignment layer is located on a side of the second flexible substrate close to the first substrate;

a liquid crystal layer located between the first substrate and the second substrate; and at least one phase shift unit, where each of the at least one phase shift unit includes a microstrip line and a phased electrode, the microstrip line is located between the first flexible substrate and the first liquid crystal alignment layer, and the phased electrode is located between the second flexible substrate and the second liquid crystal alignment layer; and a third flexible substrate located on a side of the second substrate facing away from the first substrate or located on a side of the first substrate facing away from the second substrate, wherein each of the at least one phase shift unit further includes at least one feed portion located on a side of the third flexible substrate facing away from the second substrate.

One embodiment of the present disclosure provides an antenna, which a liquid crystal phase shifter. The liquid crystal phase shifter includes a first substrate, a second substrate, a liquid crystal layer located between the first substrate and the second substrate, at least one phase shift unit, and a third flexible substrate located on a side of the second substrate facing away from the first substrate or located on a side of the first substrate facing away from the second substrate. The first substrate includes a first flexible substrate and a first liquid crystal alignment layer. The second substrate includes a second flexible substrate and a second liquid crystal alignment layer. The first liquid crystal alignment layer is located on a side of the first flexible substrate close to the second substrate, and the second liquid crystal alignment layer is located on a side of the second flexible substrate close to the first substrate. Each of the at least one phase shift unit includes a microstrip line and a phased electrode, the microstrip line is located between the first flexible substrate and the first liquid crystal alignment layer, and the phased electrode is located between the second flexible substrate and the second liquid crystal alignment layer. Each of the at least one phase shift unit further includes at least one feed portion located on a side of the third flexible substrate facing away from the second substrate.

BRIEF DESCRIPTION OF THE DRAWINGS

Embodiments of the present disclosure are described in the accompanying drawings used in the embodiments are briefly introduced as follows. Apparently, the drawings described as follows disclose embodiments of the present disclosure.

DETAIL DESCRIPTION OF THE EMBODIMENTS

In order to better understand the technical solutions of the present disclosure, the embodiments of the present disclosure are described in detail below with reference to the accompanying drawings, where like features are denoted by the same reference label throughout the drawings and throughout the specification description.

Figure 1:
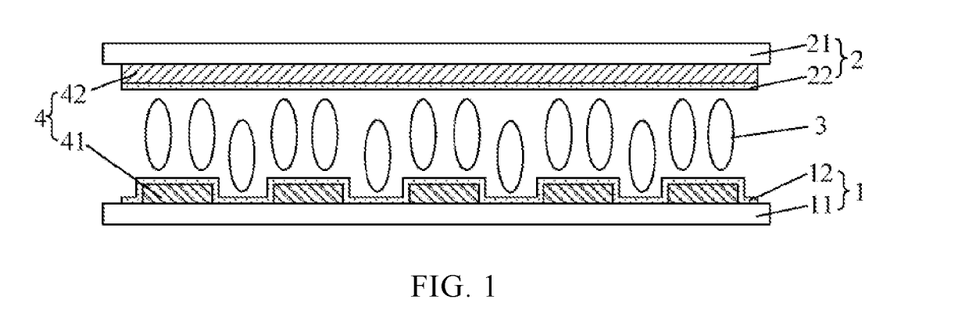
FIG. 1 is a cross-sectional diagram of a liquid crystal phase shifter according to an embodiment of the present disclosure.
Figure 2:
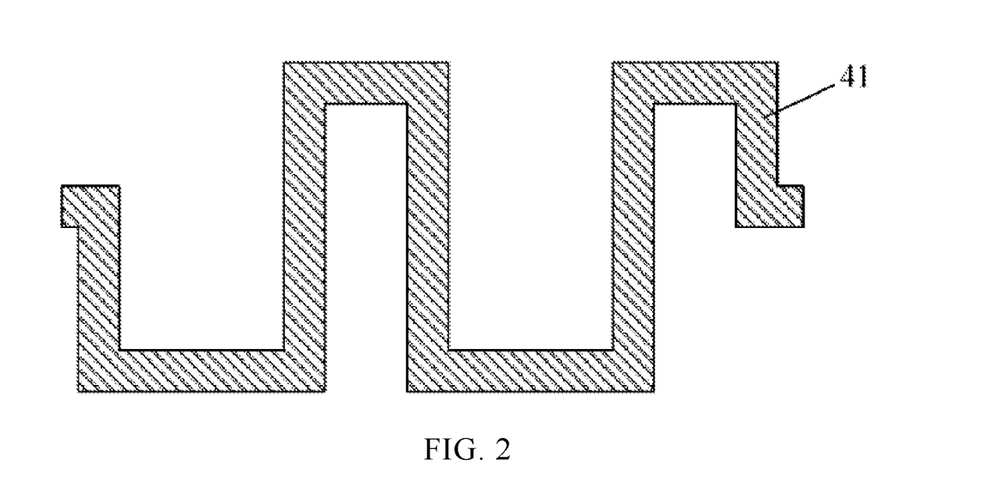
FIG. 2 is a schematic diagram of a microstrip line shown in FIG. 1.

FIG. 1 is a cross-sectional diagram of a liquid crystal phase shifter according to an embodiment of the present disclosure. FIG. 2 is a schematic diagram of a microstrip line shown in FIG. 1. As shown in FIG. 1 and FIG. 2, a liquid crystal phase shifter provided by an embodiment of the present disclosure includes a first substrate 1 and a second substrate 2 that are opposite to each other, a liquid crystal layer 3 located between the first substrate 1 and the second substrate 2, and at least one phase shift unit 4. The first substrate 1 includes a first flexible substrate 11 and a first liquid crystal alignment layer 12 that is located on a side of the first flexible substrate 11 close to the second substrate 2. The second substrate 2 includes a second flexible substrate 21 and a second liquid crystal alignment layer 22 that is located on a side of the second flexible substrate 21 close to the first substrate 1. The phase shift unit 4 includes a microstrip line 41 and a phased electrode 42. The microstrip line 41 is located between the first flexible substrate 11 and the first liquid crystal alignment layer 12, and the phased electrode 42 is located between the second flexible substrate 21 and the second liquid crystal alignment layer 22.

In one embodiment, the first flexible substrate 11 and the second flexible substrate 21 can be made of any suitable flexible insulating material. For example, the first flexible substrate 11 and the second flexible substrate 21 can be made of polymer materials such as polyimide (PI), polycarbonate (PC), poly Ether sulfone (PES), polyethylene terephthalate (PET), polyethylene naphthalate (PEN), polyarylate (PAR) or glass fiber reinforced plastic (FRP). When the liquid crystal phase shifter is not in operation, there is no voltage on the microstrip line 41 and the phased electrode 42, the liquid crystals in the liquid crystal layer 3 are orientated in a preset direction under the action of the first liquid crystal alignment layer 12 and the second liquid crystal alignment layer 22. When the liquid crystal phase shifter is operating, voltage signals are respectively supplied to the microstrip line 41 and the phased electrode 42, and an electric field is formed between the microstrip line 41 and the phased electrode 42, and the liquid crystal in the liquid crystal layer 3 are driven to be deflected by the electric field. The microstrip line 4 is configured to transmit a microwave signal, and the microwave signal is transmitted between the microstrip line 41 and the phased electrode 42. During the transmission of the microwave signal, the phase of the microwave signal is changed due to the deflection of the liquid crystals, to shift the phase of the microwave signal. The deflection angle of the liquid crystal in the liquid crystal layer 3 is controlled through the voltages on the microstrip line 41 and the phased electrode 42, and thus the phase adjusted in the phase shifting process can be controlled. It should be noted that the microstrip line 41 has a serpentine shape. However, the shape of the microstrip line 41 is not limited in embodiments of the present disclosure, as long as the microstrip line 41 can transmit the microwave signal.

In the liquid crystal phase shifter provided by embodiments of the present disclosure, the microstrip line and the phased electrode are fabricated on the flexible substrate to form the liquid crystal phase shifter, and the hardness of the liquid crystal phase shifter is reduced and the liquid crystal phase shifter has the deformable characteristics such as being flexible and bendable, and can be applied to many more scenarios, for example, attaching the liquid crystal phase shifter to airborne or vehicle-mounted structure having a cured surface. At the same time, due to the characteristics for being deformable, the liquid crystal phase shifter in an antenna can improve the concealment of the antenna. In addition, the flexible substrate can have a smaller thickness and smaller weight than the rigid substrate, so the overall thickness and weight of the liquid crystal phase shifter can be reduced, to reduce the application limitations of the liquid crystal phase shifter due to the thickness and weight.

Figure 3:
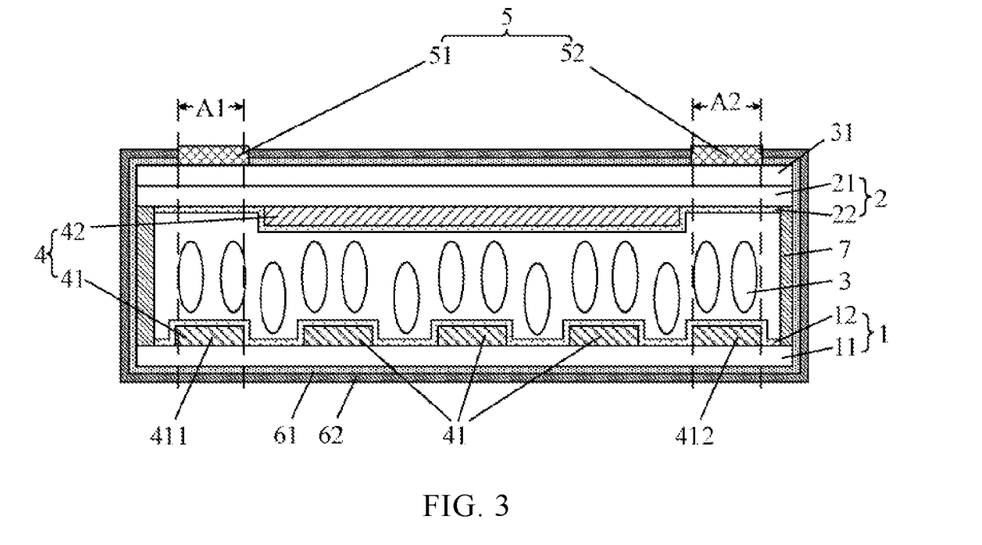
FIG. 3 is a cross-sectional diagram of another liquid crystal phase shifter according to an embodiment of the present disclosure.
Figure 4:
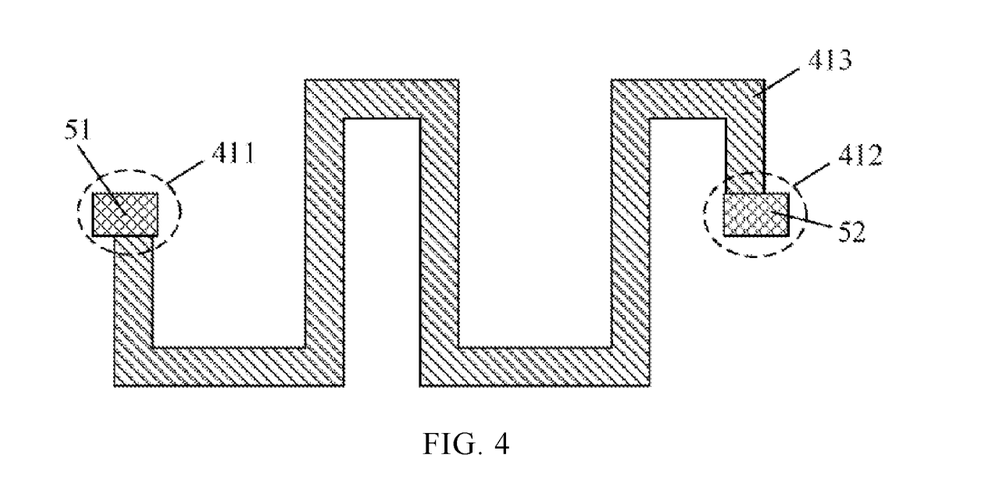
FIG. 4 illustrates schematic diagrams of a microstrip line and a feed portion shown in FIG. 3.
Figure 5:
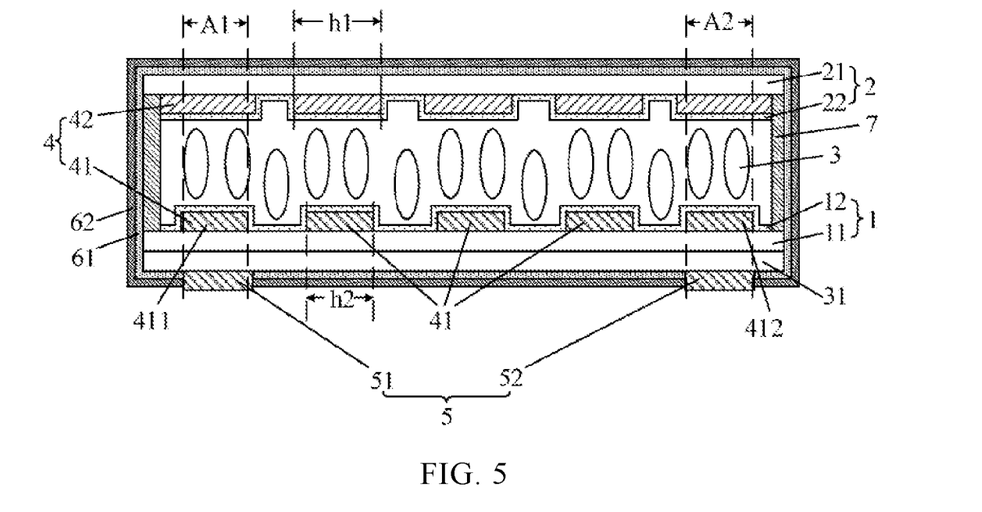
FIG. 5 is a cross-sectional diagram of another liquid crystal phase shifter according to an embodiment of the present disclosure.

FIG. 3 is a cross-sectional diagram of another liquid crystal phase shifter according to an embodiment of the present disclosure. FIG. 4 is a schematic diagram of a microstrip line and a feed portion shown in FIG. 3. In one embodiment, as shown in FIG. 3 and FIG. 4, the liquid crystal phase shifter further includes a third flexible substrate 31 that is located on a side of the second substrate 2 facing away from the first substrate 1 or is located on a side of the first substrate 1 facing away from the second substrate 2 as shown in FIG. 3. For example, as shown in FIG. 3, the third flexible substrate 31 is located on a side of the second substrate 2 facing away from the first substrate 1. As shown in FIG. 5, which is across-sectional diagram of another liquid crystal phase shifter according to an embodiment of the present disclosure, the third flexible substrate 31 is located on a side of the first substrate 1 facing away from the second substrate 2, and the phase shift unit 4 includes at least one feed portion 5. The at least one feed portion 5 is located on a side of the third flexible substrate 31 facing away from the second substrate 2. The feed portion 5 is used for feeding in and feeding out the microwave signal transmitted in the microstrip line 41. The first substrate 1 and the second substrate 2 form a liquid crystal cell. By connecting the feed portion 5 outside the liquid crystal cell, other devices can transmit the microwave signal having a phase to be shifted, to the microstrip line 41, and transmit the microwave signal having a phase shifted, to a corresponding device through the feed portion 5. The feed portion 5 can be a feed line or device in other forms.

In one embodiment, as shown in FIG. 3, the third flexible substrate 31 is located on the side of the second substrate 2 facing away from the first substrate 1, the at least one feed portion 5 includes a first feed portion 51 and a second feed portion 52, and the microstrip line 41 includes a first feed terminal 411 and a second feed terminal 412. In each phase shift unit 4, an orthographic projection of the first feed portion 51 on the first flexible substrate 11 and an orthographic projection of the first feed terminal 411 on the first flexible substrate 11 overlap with each other in a first area A1, and an orthographic projection of the second feed portion 52 on the first flexible substrate 11 and an orthographic projection of the second feeder terminal 412 on the first flexible substrate 11 overlap with each other in a second area A2, an orthographic projection of the phased electrode 42 on the first flexible substrate 11 overlap with neither the first area A1 nor the second area A2.

In one embodiment, the first feed portion 51 and the second feed portion 52 are respectively configured to feed the microwave signal into the microstrip line 41 and feed the microwave signal out from the microstrip line 41. In a case where the third flexible substrate 31 is located on a side of the second substrate 2 facing away from the first substrate 1, the phased electrode 42 is arranged between the feed portion 5 and the microstrip 41 and shields the microwave signal. Therefore, in order to prevent the phased electrode 42 from adversely affecting the feeding in and feeding out of the microwave signal transmitted in the microstrip line 41, at the feeding-in position and the feeding-out position, the microstrip line 41 needs to be exposed from the phased electrode 42, and the first feed portion 51 and the first feed terminal 411 can perform feed in the first area A1 without being affected by the phased electrode 42, similarly, the second feed portion 52 and the second feed terminal 412 can perform feed in the second area A2 without being affected by the phased electrode 42.

Figure 6:
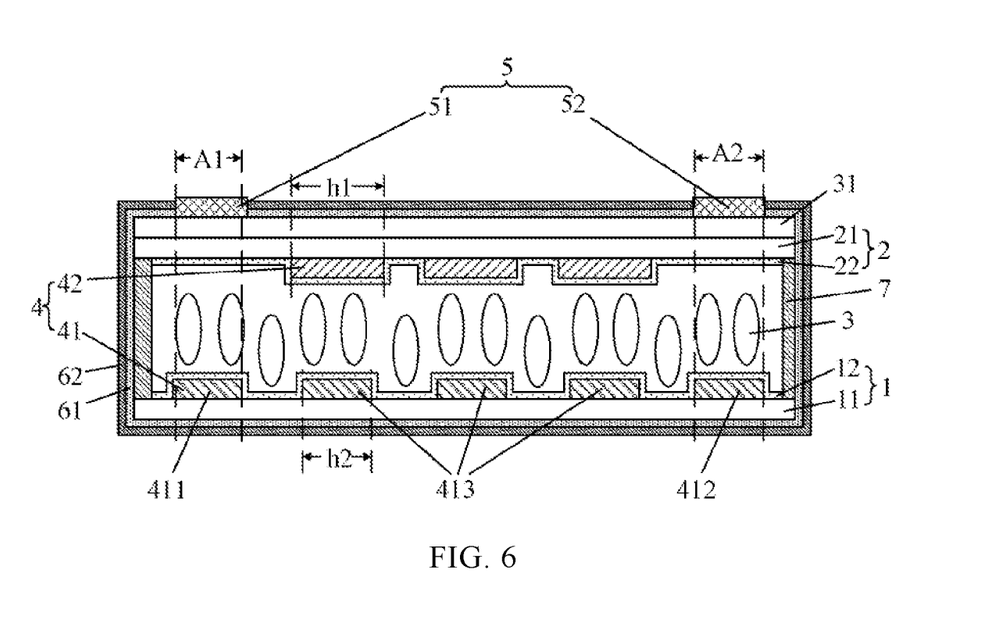
FIG. 6 is a cross-sectional diagram of another liquid crystal phase shifter according to an embodiment of the present disclosure.
Figure 7:
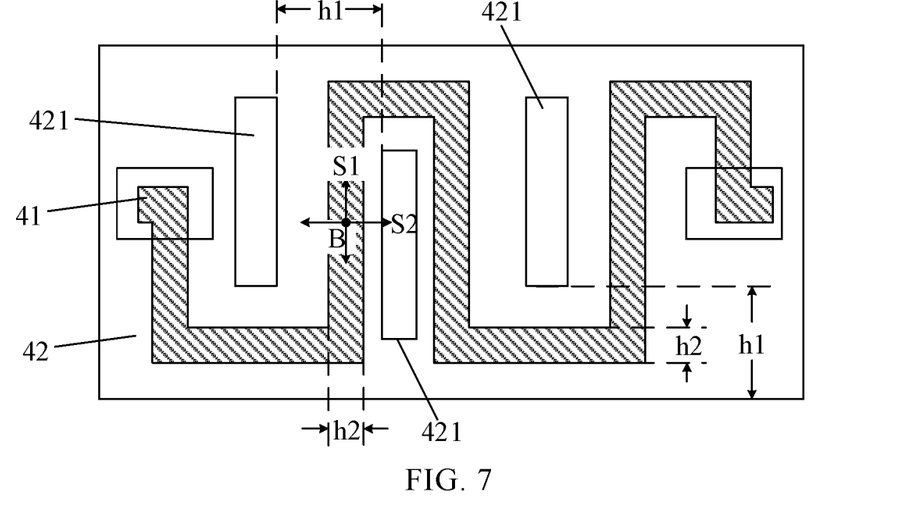
FIG. 7 is a top view of a phased electrode and a microstrip line shown in FIG. 6.
Figure 8:
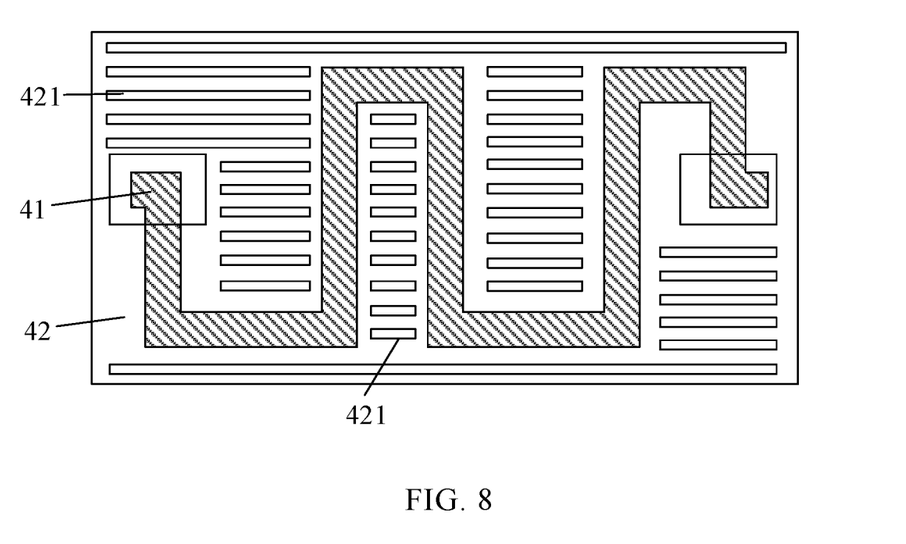
FIG. 8 is another top view of a phased electrode and a microstrip line shown in FIG. 6.
Figure 9:
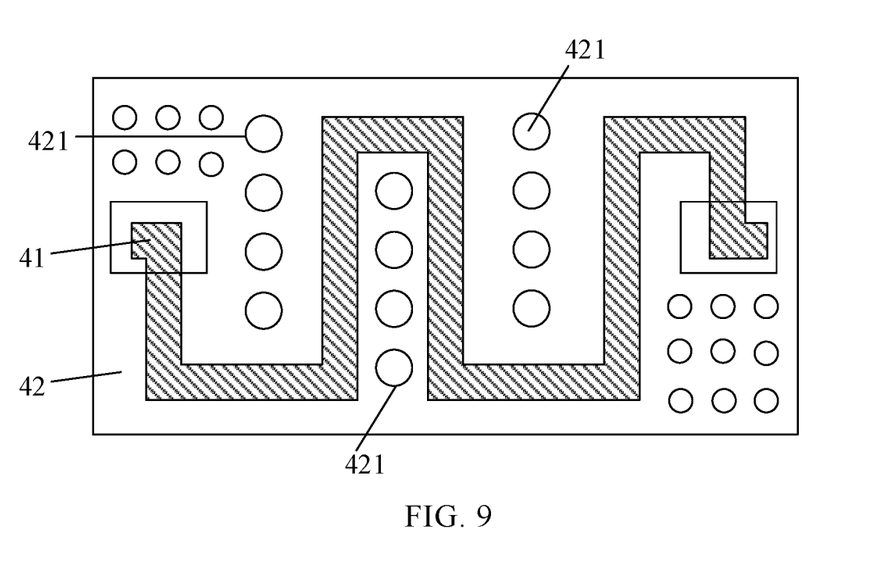
FIG. 9 is another top view of a phased electrode and a microstrip line shown in FIG. 6.

FIG. 6 is a cross-sectional diagram of still another liquid crystal phase shifter according to an embodiment of the present disclosure. In one embodiment, as shown in FIG. 4 and FIG. 6, in each phase shift unit 4 (FIG. 6), the microstrip line 41 (FIG. 6) includes a wire portion 413 connected between the first feed terminal 411 and the second feed terminal 412. FIG. 7 is a top view of the phased electrode and the microstrip line shown in FIG. 6. FIG. 8 is another top view of the phased electrode and the microstrip line shown in FIG. 6. FIG. 9 is yet another top view of the phased electrode and the microstrip line shown in FIG. 6. As shown in FIG. 7, FIG. 8 and FIG. 9, the phased electrode 42 includes a hollow region 421. As shown in FIG. 6, an orthographic projection of the wire portion 413 on the first flexible substrate 11 is located in the orthographic projection of the phased electrode 42 on the first flexible substrate 11.

In one embodiment, in order to adapt to the liquid crystal phase shifter with characteristics of having flexible substrate and being deformable, the phased electrode 42 is provided with a hollow region, and the hollow region needs to be disposed outside the wire portion 413 of the microstrip line 41, and the transmission of the microwave signal is limited between the microstrip line 41 and the phased electrode 42. The hollow region can have a bar shape or a circle shape. By setting the hollow region on the phased electrode 42, the layer where the phased electrode 42 is located has a better bending characteristic. In addition, it should be noted that the phased electrode 42 also needs to be hollowed in the first area A1 and the second area A2 to facilitate the feeding in and out of the microwave signal.

In one embodiment, as shown in FIG. 5, the third flexible substrate 31 is located on a side of the first substrate 1 facing away from the second substrate 2, the at least one feed portion 5 includes a first feed portion 51 and a second feed portion 52, and the microstrip line 41 includes a first feed terminal 411 and a second feed terminal 412. In each phase shift unit 4, an orthographic projection of the first feed portion 51 on the first flexible substrate 11 and an orthographic projection of the first feed terminal 411 on the first flexible substrate 11 overlap with each other in a first area A1, and an orthographic projection of the second feed portion 52 on the first flexible substrate 11 and an orthographic projection of the second feed terminal 412 on the first flexible substrate 11 overlap with each other in a second area A2.

In one embodiment, when the feed portion 5 is located on a side of the first substrate 1, the phased electrode 42 is not arranged between the feed portion 5 and the microstrip line 41 and does not blocks the feed portion 5 and the microstrip line 41, so in the first area A1 and the second area A2, the feed portion 5 can directly feed the microwave signal into the microstrip line 41 and feed the microwave signal out from the microstrip line 41, and the phased electrode 42 does not need to be in one embodiment configured, as long as the orthographic projection of the phased electrode 42 on the first flexible substrate 11 completely covers the orthographic projection of microstrip line 41 on the first flexible substrate 11. The orthographic projection of the first feed terminal 411 and the orthographic projection of the second feed terminal 412 on the first flexible substrate 11 can be located outside the orthographic projection of the phased electrode 42 on the first flexible substrate 11.

In one embodiment, as shown in FIG. 5, in each phase shift unit 4, the phased electrode 4 includes a hollow region, and the orthographic projection of the microstrip line 4 on the first flexible substrate 11 is within the orthographic projection of the phased electrode 42 on the first flexible substrate 11.

In one embodiment, as shown in FIG. 5 to FIG. 9, in each phase shift unit 4, $$\frac{(h1 - h2)}{h2} \geq 10\%,$$

where h1 is a width of the phased electrode 42 in a direction perpendicular to a direction along which the microstrip line 41 extends, and h2 is a width of the microstrip line 41.

In one embodiment, since the microstrip line 41 generally extends in different directions at different positions rather than extending in a constant direction, the microstrip line 41 finally forms a curve. For example, the microstrip line 41 in FIG. 7 to FIG. 9 has a serpentine shape. Therefore, h1 and h2 are two widths corresponding to any node of the microstrip line 41. For example, for a node B of the microstrip line 41, the microstrip line 41 extends in a first direction S1 at the node B, and h1 corresponding to the node B is the width, in a second direction S2, of the phased electrode 42 at the node B, and the second direction S2 is perpendicular to the first direction S1. Since each of two ends of the phased electrode 42 in the second direction S2 at the node B has a hollow region 421, h1 is the distance between the two hollow regions 421, that is, the width of the phased electrode 42 in a direction perpendicular to the extending direction of the microstrip line 41, and h2 is the width of the microstrip line 41 in the second direction S2 at the node B. It is set that the width h1 of the phased electrode 42 is greater than the width h2 of the microstrip line 41, and $$\frac{(h1 - h2)}{h2} \geq 10\%,$$

which can avoid deviations between the phased electrode 42 and the microstrip line 41 caused by process errors, which adversely affects the phase shift.

In addition, the liquid crystal phase shifter shown in FIG. 3 and FIG. 5 includes the feed portion 5 for feeding-in and feeding-out of the microwave signal. For example, assuming that the first feed portion 51 is configured to feed the microwave signal to the microstrip line 41 and the second feed portion 52 is configured to feed out the microwave signal on the microstrip line 41. The first feed portion 51 further needs to be connected to a signal source for generating the microwave signal. The second feed portion 52 needs to be connected to an antenna radiating unit configured to radiate microwave signals or to other devices for further processing of the microwave signal. In other achievable embodiments, in addition to transmit the microwave signal between the microstrip line 41 and other devices achieved by the feed portion, a device such as an antenna radiation unit can also be directly provided on the surface of the liquid crystal shifter, and the microwave signal transmission between this device and the microstrip line 41 can be directly realized.

In one embodiment, as shown in FIG. 3, FIG. 5 and FIG. 6, the liquid crystal phase shifter further includes at least one of a protecting layer 61 or a stealth coating 62 provided on a surface of the liquid crystal phase shifter.

In one embodiment, a sealant 7 is provided between the first substrate 1 and the second substrate 2, and configured to encapsulate the liquid crystal layer 3. As shown in FIG. 3 and FIG. 6, the at least one of the protecting layer 61 or the stealth coating 62 is disposed on a surface of the third flexible substrate 31 facing away from the first substrate 1, is disposed on a surface of the first flexible substrate 11 facing away from the second substrate 2, and is disposed on a surface of the sealant 7. As shown in FIG. 5, the at least one of the protecting layer 61 or the stealth coating 62 is disposed on a surface of the second flexible substrate 21 facing away from the first substrate 1, is disposed on a surface of the third flexible substrate 31 facing away from the first substrate 1, and is disposed on the surface of the sealant 7. The protecting layer 61 is configured to reinforce the flexible substrate to prevent the flexible substrate from being broken when being bent and deformed. The stealth coating 62 has light reflection characteristics, which can improve the concealment of the liquid crystal shifter, so that the liquid crystal shifter is not easily found by human eyes. It should be noted that, when the liquid crystal shifter includes both the protecting layer 61 and the stealth coating 62, the stealth coating 62 is provided on an outer surface of the protecting layer 61. In addition, the protecting layer 61 and the stealth coating 62 can also be a same layer, that is, one kind of material is used for achieving both the reinforce and protection function and the concealment function.

In one embodiment, the at least one of the protecting layer 61 or the stealth coating 62 is provided with an opening for exposing the feed portion 5, and the opening is used for preventing the at least one of the protecting layer 61 or the stealth coating 62 from affecting the feed.

In one embodiment, the phased electrode 42 is supplied with a fixed potential, for example, is grounded. On the one hand, different potentials are respectively supplied to the phased electrode 42 and the microstrip line 41 to form an electric field for driving the liquid crystals in the liquid crystal layer 3 to deflect to realize the phase shift function. On the other hand, a fixed potential is supplied to the phased electrode 42 to shield or limit the microwave signal, and the microwave signal is transmitted between the microstrip line 41 and the phased electrode 42, to achieve the phase shift through the liquid crystal layer 3 arranged between the microstrip line 41 and the phased electrode 42.

Figure 10:
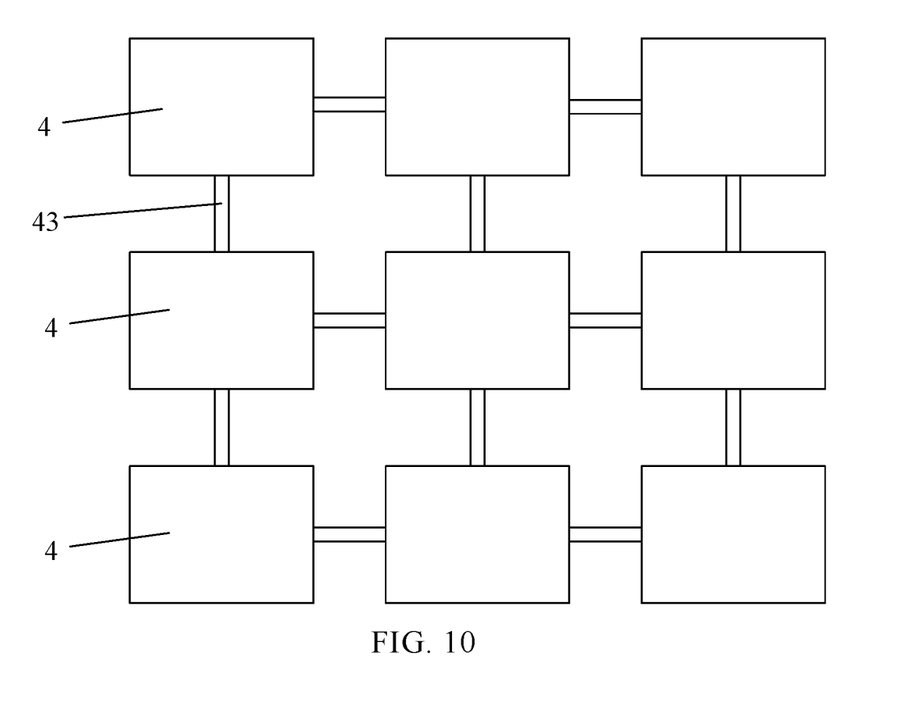
FIG. 10 is a schematic diagram of a liquid crystal phase shifter according to an embodiment of the present disclosure.

In one embodiment, as shown in FIG. 10, which is a schematic diagram of a liquid crystal phase shifter according to an embodiment of the present disclosure, the liquid crystal phase shifter includes multiple phase shift units 4 arranged in an array, and phased electrode connecting portions 43. The phased electrode connecting portion 43 is arranged between two adjacent phase shift units 4. At least two adjacent phased electrodes are electrically connected via the phased electrode connecting portion 43. The phased electrode connecting portion 43 includes a hollow region. The phased electrode and the phased electrode connecting portion 43 can be formed by patterning a same electrode layer, and the hollow region of the phased electrode connecting portion 43 is a part between two adjacent phase shift units 4 where there is no electrode layer.

In one embodiment, each phase shift unit 4 is configured to shift of a phase of one microwave signal. In scenarios where it is needed to shift phases of multiple microwave signals simultaneously, the liquid crystal shifter includes multiple phase shift units 4 arranged in an array, and the multiple phase shift unit 4 can be made as different liquid crystal cells or made as a same liquid crystal cell. The phased electrode connecting portion 43 is configured to connect the phased electrodes of different phase shift units 4, and all the phased electrodes have a same potential. The phased electrode connecting portion 43 includes a hollow region, which can adapt to the characteristics of the liquid crystal shifter of being flexible and deformable.

An embodiment of the present disclosure provides an antenna including the above liquid crystal phase shifter. Therefore, the antenna has characteristics of low hardness, bendability, thin thickness, and light weight, and can better achieve curved surface applications. For example, the antenna can be attached onto a communication device, which improves the concealment of the antenna.

Figure 11:
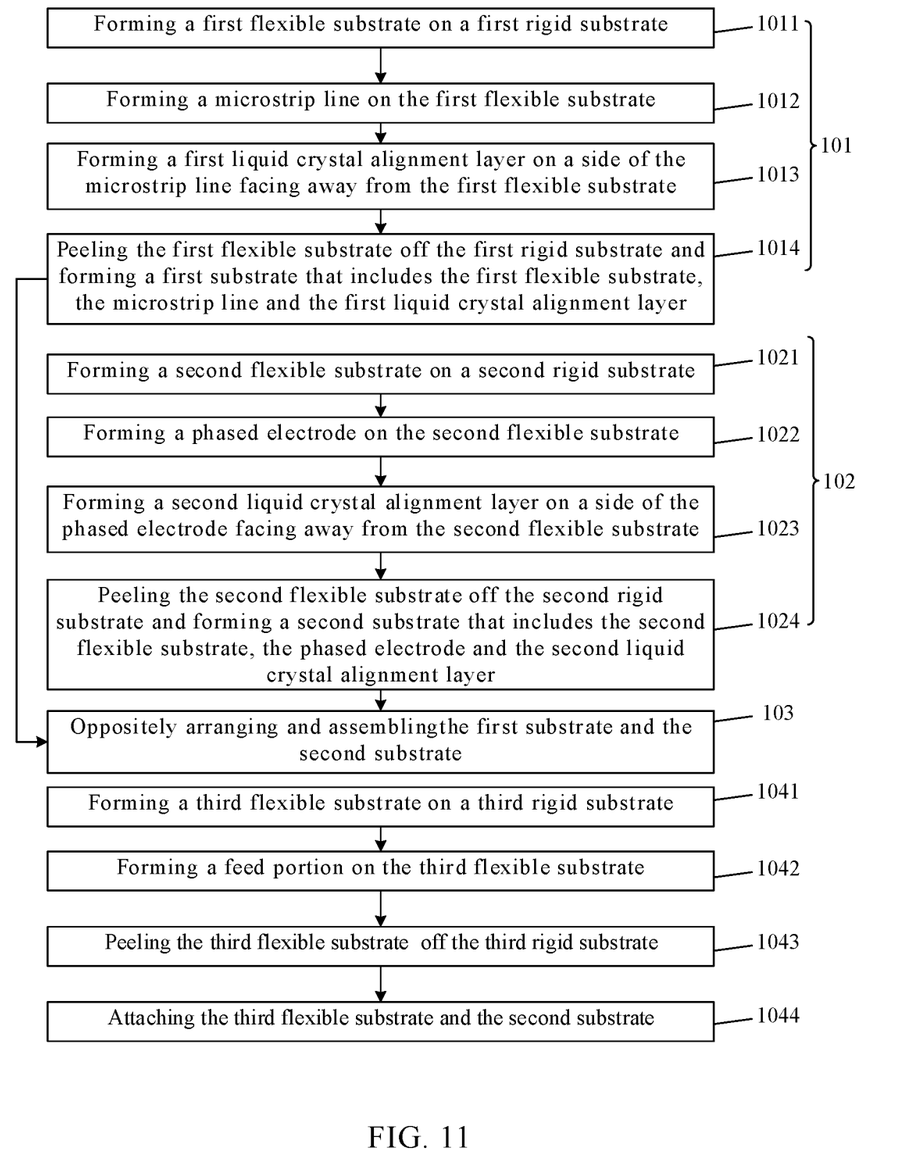
FIG. 11 is a flowchart of a method for manufacturing a liquid crystal phase shifter according to an embodiment of the present disclosure.

An embodiment of the present disclosure further provides a method for manufacturing a liquid crystal phase shifter. The method is used for manufacturing the above liquid crystal phase shifter. FIG. 11 is a flowchart of the method for manufacturing a liquid crystal phase shifter. As shown in FIG. 1, FIG. 3, FIG. 5, FIG. 6 and FIG. 11, the method includes as shown in FIG. 11 step 101, step 102 and step 103.

At step 101, a first substrate 1 is formed.

At step 102, a second substrate 2 is formed.

The step 101 of forming the first substrate 1 includes step 1011, step 1012, step 1013 and step 1014.

At step 1011, a first flexible substrate 11 is formed on a first rigid substrate.

The first rigid substrate can be a glass substrate, a silicon substrate, a hard resin, a metal sheet, etc. Then the first rigid substrate is coated with a flexible material such as polyimide (PI), polycarbonate (PC), poly Ether sulfone (PES), polyethylene terephthalate (PET), polyethylene naphthalate (PEN), polyarylate (PAR) or glass fiber reinforced plastic (FRP), etc. The flexible material is dried to form a film, and thus the first flexible substrate 11 is formed.

At step 1012, a microstrip line 41 is formed on the first flexible substrate 11.

At step 1013, a first liquid crystal alignment layer 12 is formed on a side of the microstrip line 41 facing away from the first flexible substrate 11, and an alignment process is performed on the first liquid crystal alignment layer 12.

At step 1014, the first flexible substrate 11 is peeled off the first rigid substrate, and the first substrate 1 including the first flexible substrate 11, the microstrip line 41 and the first liquid crystal alignment layer 12 is formed.

The step 102 of forming the second substrate 2 includes step 1021, step 1022, step 1023 and step 1024.

At step 1021, a second flexible substrate 21 is formed on a second rigid substrate.

The process of forming the second flexible substrate 21 is similar to the process of forming the first flexible substrate 11 and will not be repeated herein.

At step 1022, a phased electrode 42 is formed on the second flexible substrate 21.

At step 1023, a second liquid crystal alignment layer 22 is formed on a side of the phased electrode 42 facing away from the second flexible substrate 21, and an alignment process is performed on the second liquid crystal alignment layer 22.

At step 1024, the second flexible substrate 11 is peeled off the second rigid substrate, and the second substrate 2 including the second flexible substrate 21, the phased electrode 42 and the second liquid crystal alignment layer 22 is formed.

At step 103, the first substrate 1 and the second substrate 2 are oppositely arranged and assembled in such a manner that the first liquid crystal alignment layer 12 is located on a side of the first substrate 1 close to the second substrate 2 and the second liquid crystal alignment layer 22 is located on a side of the second substrate 2 close to the first substrate 1, a liquid crystal layer 3 is filled between the first substrate 1 and the second substrate 2, and the liquid crystal layer 3 is encapsulated with a sealant.

It should be noted that there is no limit to the order of step 101 and step 102. Step 101 can be executed first, and then step 102 is executed. In one embodiment, step 102 can be executed first, and then step 101 is executed. In one embodiment, step 101 and step 102 can be executed simultaneously.

As shown in FIG. 3, FIG. 5, FIG. 6 and FIG. 11, the above method further includes step 1041, step 1042, step 1043 and step 1044.

At step 1041, a third flexible substrate 31 is formed on a third rigid substrate.

At step 1042, a feed portion 5 is formed on the third flexible substrate 31.

At step 1043, the third flexible substrate 31 is peeled off the third rigid substrate.

At step 1044, the third flexible substrate 31 and the second substrate 2 are attached to each other in such a manner that the feed portion 5 is located on a side of the third flexible substrate 31 facing away from the second substrate 2 and the phased electrode 42 is located on a side of the second flexible substrate 21 facing away from the third flexible substrate 31; in one embodiment, the third flexible substrate 31 and the first substrate 1 are attached to each other in such a manner that the feed portion 5 is located on a side of the third flexible substrate 31 facing away from the second substrate 2 and the microstrip line 41 is located on a side of the first flexible substrate 11 facing away from the third flexible substrate 31.

The foregoing descriptions are merely embodiments of the present disclosure, and are not used to limit the present disclosure. Any modifications, equivalent substitutions, improvements, and the like made based on the spirit and principle of the present disclosure should be included in the protection scope of the present disclosure.

What is claimed is:

1. A liquid crystal phase shifter, comprising:
   a first substrate comprising a first flexible substrate and a first liquid crystal alignment layer;
   a second substrate comprising a second flexible substrate and a second liquid crystal alignment layer, wherein the first substrate and the second substrate are opposite to each other, the first liquid crystal alignment layer is located on a side of the first flexible substrate close to the second substrate, and the second liquid crystal alignment layer is located on a side of the second flexible substrate close to the first substrate;
   a liquid crystal layer located between the first substrate and the second substrate;
   at least one phase shift unit, wherein each of the at least one phase shift unit comprises a microstrip line and a phased electrode, the microstrip line is located between the first flexible substrate and the first liquid crystal alignment layer, and the phased electrode is located between the second flexible substrate and the second liquid crystal alignment layer; and
   a third flexible substrate located on a side of the second substrate facing away from the first substrate or located on a side of the first substrate facing away from the second substrate, wherein each of the at least one phase shift unit further comprises at least one feed portion located on a side of the third flexible substrate facing away from the second substrate.

2. The liquid crystal phase shifter according to claim 1, further comprising:
   at least one of a protecting layer or a stealth coating provided on a surface of the liquid crystal phase shifter.

3. The liquid crystal phase shifter according to claim 2, wherein the at least one of the protecting layer or the stealth coating is provided with an opening for exposing the at least one feed portion.

4. The liquid crystal phase shifter according to claim 1, wherein in each of the at least one phase shift unit, the phased electrode is supplied with a fixed potential.

5. The liquid crystal phase shifter according to claim 1, wherein the third flexible substrate is located on a side of the first substrate facing away from the second substrate, wherein in each of the at least one phase shift unit, the at least one feed portion comprises a first feed portion and a second feed portion, and the microstrip line comprises a first feed terminal and a second feed terminal;
   wherein in each of the at least one phase shift unit, an orthographic projection of the first feed portion on the first flexible substrate and an orthographic projection of the first feed terminal on the first flexible substrate overlap with each other in a first area, and an orthographic projection of the second feed portion on the first flexible substrate and an orthographic projection of the second feed terminal on the first flexible substrate overlap with each other in a second area.

6. The liquid crystal phase shifter according to claim 5, wherein in each of the at least one phase shift unit, the phased electrode comprises a hollow region, and an orthographic projection of the microstrip line on the first flexible substrate is located in an orthographic projection of the phased electrode on the first flexible substrate.

7. The liquid crystal phase shifter according to claim 6, wherein in each of the at least one phase shift unit, $$\frac{(h1-h2)}{h2} \geq 10\%,$$

where h1 is a width of the phased electrode in a direction perpendicular to a direction along which the microstrip line extends, and h2 is a width of the microstrip line.

8. The liquid crystal phase shifter according to claim 6, further comprising:
   a phased electrode connecting portion, wherein the at least one phase shift unit comprises a plurality of phase shift units arranged in an array, the electrode connecting portion is arranged between two adjacent phase shift units of the plurality of phase shift units, and at least two adjacent phased electrodes of the phased electrodes of the plurality of phase shift units are connected to each other through the phased electrode connecting portion; and
   wherein the phased electrode connecting portion has a hollow region.

9. The liquid crystal phase shifter according to claim 1, wherein the third flexible substrate is located on the side of the second substrate facing away from the first substrate, wherein in each of the at least one phase shift unit, the at least one feed portion comprises a first feed portion and a second feed portion, and the microstrip line comprises a first feed terminal and a second feed terminal; and wherein in each of the at least one phase shift unit, an orthographic projection of the first feed portion on the first flexible substrate and an orthographic projection of the first feed terminal on the first flexible substrate overlap with each other in a first area, an orthographic projection of the second feed portion on the first flexible substrate and an orthographic projection of the second feed terminal on the first flexible substrate overlap with each other in a second area, and an orthographic projection of the phased electrode on the first flexible substrate overlaps with neither the first area nor the second area.

10. The liquid crystal phase shifter according to claim 9, wherein in each of the at least one phase shift unit, the microstrip line comprises a wire portion connected between the first feed terminal and the second feed terminal, the phased electrode comprises a hollow region, and an orthographic projection of the wire portion on the first flexible substrate is located in the orthographic projection of the phased electrode on the first flexible substrate.

11. The liquid crystal phase shifter according to claim 4, further comprising:
a phased electrode connecting portion, wherein the at least one phase shift unit comprises a plurality of phase shift units arranged in an array, the phased electrode connecting portion is arranged between two adjacent phase shift units of the plurality of phase shift units, and at least two adjacent phased electrodes of the phased electrodes of the plurality of phase shift units are connected to each other through the phased electrode connecting portion; and
wherein the phased electrode connecting portion has a hollow region.

12. The liquid crystal phase shifter according to claim 10, wherein in each of the at least one phase shift unit, $$\frac{(h1 - h2)}{h2} \geq 10\%,$$

where h1 is a width of the phased electrode in a direction perpendicular to a direction along which the microstrip line extends, and h2 is a width of the microstrip line.

13. An antenna, comprising a liquid crystal phase shifter, wherein the liquid crystal phase shifter comprises:
a first substrate comprising a first flexible substrate and a first liquid crystal alignment layer;
a second substrate comprising a second flexible substrate and a second liquid crystal alignment layer, wherein the first substrate and the second substrate are opposite to each other, the first liquid crystal alignment layer is located on a side of the first flexible substrate close to the second substrate, and the second liquid crystal alignment layer is located on a side of the second flexible substrate close to the first substrate;
a liquid crystal layer located between the first substrate and the second substrate;
at least one phase shift unit, wherein each of the at least one phase shift unit comprises a microstrip line and a phased electrode, the microstrip line is located between the first flexible substrate and the first liquid crystal alignment layer, and the phased electrode is located between the second flexible substrate and the second liquid crystal alignment layer; and
a third flexible substrate located on a side of the second substrate facing away from the first substrate or located on a side of the first substrate facing away from the second substrate, wherein each of the at least one phase shift unit further comprises at least one feed portion located on a side of the third flexible substrate facing away from the second substrate.

14. The antenna according to claim 13, wherein in each of the at least one phase shift unit, the phased electrode is supplied with a fixed potential.

15. The antenna according to claim 13, wherein the third flexible substrate is located on the side of the second substrate facing away from the first substrate, wherein in each of the at least one phase shift unit, the at least one feed portion comprises a first feed portion and a second feed portion, and the microstrip line comprises a first feed terminal and a second feed terminal; and
wherein in each of the at least one phase shift unit, an orthographic projection of the first feed portion on the first flexible substrate and an orthographic projection of the first feed terminal on the first flexible substrate overlap with each other in a first area, an orthographic projection of the second feed portion on the first flexible substrate and an orthographic projection of the second feed terminal on the first flexible substrate overlap with each other in a second area, and an orthographic projection of the phased electrode on the first flexible substrate overlaps with neither the first area nor the second area.

16. The antenna according to claim 15, wherein in each of the at least one phase shift unit, the microstrip line comprises a wire portion connected between the first feed terminal and the second feed terminal, the phased electrode comprises a hollow region, and an orthographic projection of the wire portion on the first flexible substrate is located in the orthographic projection of the phased electrode on the first flexible substrate.

17. The antenna according to claim 16, wherein in each of the at least one phase shift unit, $$\frac{(h1 - h2)}{h2} \geq 10\%,$$

where h1 is a width of the phased electrode in a direction perpendicular to a direction along which the microstrip line extends, and h2 is a width of the microstrip line.

18. The antenna according to claim 13, wherein the third flexible substrate is located on a side of the first substrate facing away from the second substrate, wherein in each of the at least one phase shift unit, the at least one feed portion comprises a first feed portion and a second feed portion, and the microstrip line comprises a first feed terminal and a second feed terminal;
wherein in each of the at least one phase shift unit, an orthographic projection of the first feed portion on the first flexible substrate and an orthographic projection of the first feed terminal on the first flexible substrate overlap with each other in a first area, and an orthographic projection of the second feed portion on the first flexible substrate and an orthographic projection of the second feed terminal on the first flexible substrate overlap with each other in a second area.

19. The antenna according to claim 18, wherein in each of the at least one phase shift unit, the phased electrode comprises a hollow region, and an orthographic projection of the microstrip line on the first flexible substrate is located in an orthographic projection of the phased electrode on the first flexible substrate.

20. The antenna according to claim 19, wherein in each of the at least one phase shift unit, $$\frac{(h1 - h2)}{h2} \geq 10\%,$$

where h1 is a width of the phased electrode in a direction perpendicular to a direction along which the microstrip line extends, and h2 is a width of the microstrip line.

* * * * *